United States Patent [19]

Wysocki et al.

[11] 4,257,075
[45] Mar. 17, 1981

[54] TAPE MAGAZINE AND RECORDING AND/OR PLAYBACK MACHINE WITH IMPROVED MAGAZINE LOCATING AND LOADING STRUCTURE

[75] Inventors: Steve S. Wysocki, North St. Paul; Norman E. Nelson; Peter J. Vogelgesang, both of Roseville, all of Minn.

[73] Assignee: Minnesota Mining and Manufacturing Company, St. Paul, Minn.

[21] Appl. No.: 23,301

[22] Filed: Mar. 23, 1979

[51] Int. Cl.³ .................... G11B 23/06; G11B 15/26; G11B 15/60
[52] U.S. Cl. .......................... 360/96.5; 242/55.19 A; 360/93; 360/132
[58] Field of Search .................. 360/96.5, 93, 90, 132; 242/55.19 A, 71.8

[56] References Cited

U.S. PATENT DOCUMENTS

| | | | |
|---|---|---|---|
| 2,918,536 | 12/1959 | Appert et al. | 360/93 |
| 3,287,508 | 11/1966 | Morrison | 360/93 |
| 4,060,838 | 11/1977 | Meermans | 360/96.5 |

Primary Examiner—Alfred H. Eddleman
Attorney, Agent, or Firm—Cruzan Alexander; Donald M. Sell; William L. Huebsch

[57] ABSTRACT

A locating and loading mechanism for a magazine used in a recording and/or playback machine. The magazine includes a generally cylindrical hub portion; an endless length of strip material wound in a coil about the hub portion and extending from the innermost wrap of the coil partially across a central opening in the hub and around the side surface of the coil to the outermost wrap of the coil; and a case enclosing the hub portion and endless length of strip material having three spaced openings. The machine includes three spaced support pins adapted to enter the openings in the case and accurately support the magazine at a station on the machine with respect to drive members, a guide, and transducers in the central opening of the hub. A movable frame portion is adopted to receive the magazine and guide the magazine onto and off of the support pins at the station.

6 Claims, 10 Drawing Figures

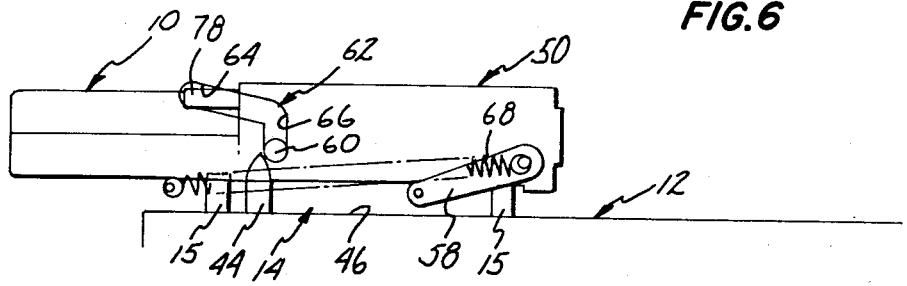
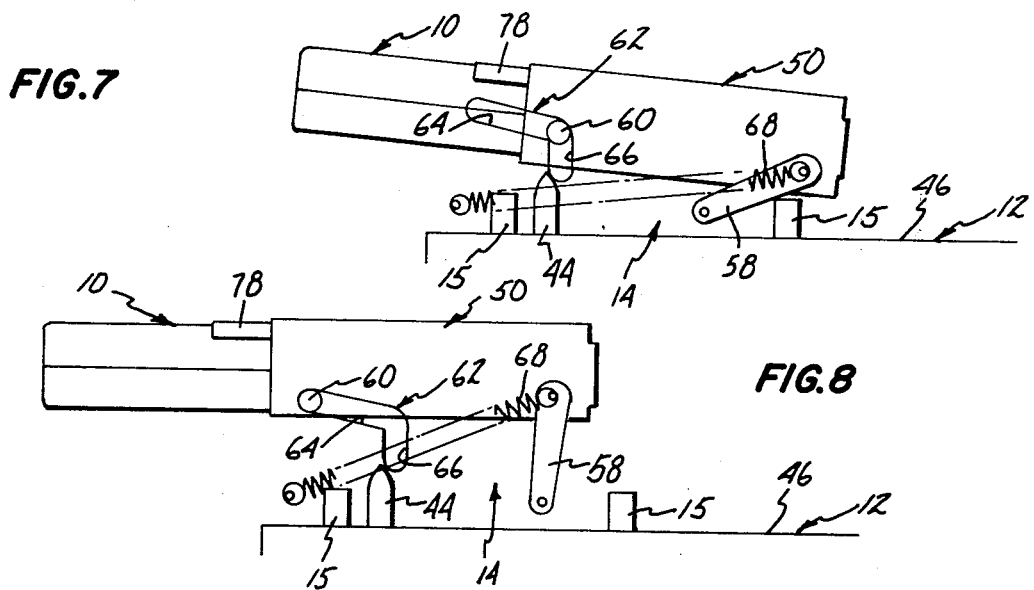
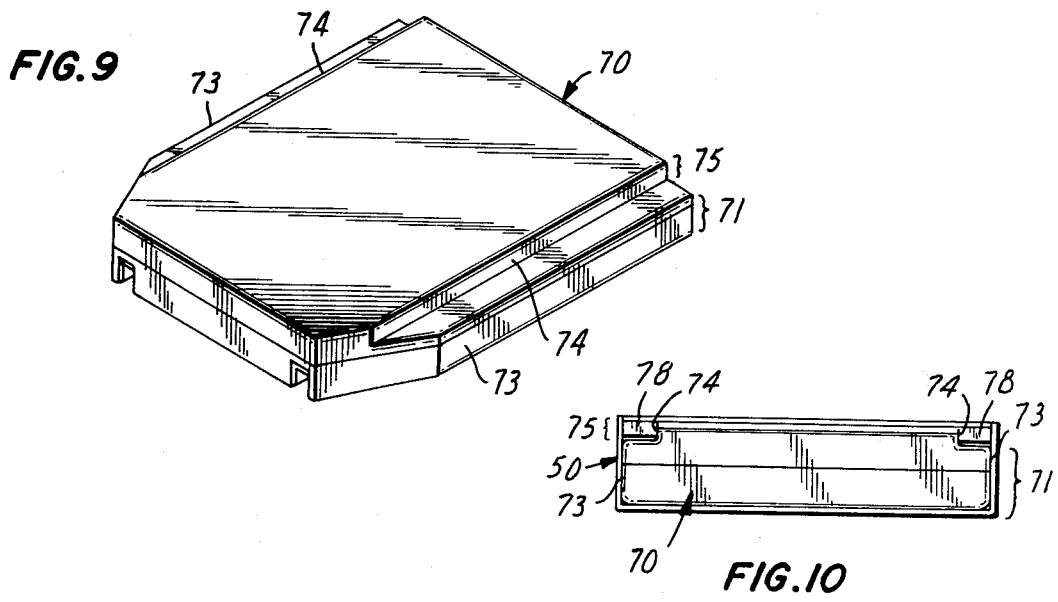

TAPE MAGAZINE AND RECORDING AND/OR PLAYBACK MACHINE WITH IMPROVED MAGAZINE LOCATING AND LOADING STRUCTURE

BACKGROUND OF THE INVENTION

The present invention relates to magazines including an endless length of strip material, machines including a magazine receiving station at which is positioned a transducer for recording and/or for reading signals on the strip material in the magazine, and means provided by the combination of the magazine and machine for releasably positioning the magazine at the station.

U.S. patent application No. 820,250, filed July 29, 1977, now abandoned, (incorporated herein by reference) describes a magazine comprising a housing including a fixed hub having a central opening and having a through slot extending axially across the full width of the hub and communicating with the central opening, and including a flange projecting radially outwardly from one edge of the hub; and an endless length of strip material or magnetic recording tape having a major portion wrapped about the hub to form a coil, and a minor portion extending from the innermost wrap of the coil, partially across the central opening and around the side surface of the coil to the outermost wrap of the coil. Also described is a recording and/or playback machine including a transducer at a station at which station the magazine can be releasably received, means at the station adapted for driving engagement with the minor portion of the tape to pull the tape through the slot and across the transducer, and means on the machine for guiding the tape in a precise predetermined path past the transducer.

With this arrangement it has been found that the coil of tape around the hub will shift axially along the hub to align the edges of the coil with the edges of the tape being pulled past the transducer, which results in little or no transverse tension in the tape and affords reproduction from magnetic recording tape with extremely low phase error which is particularly desirable for reproducing music in the broadcast industry.

While this system is extremely effective, the possibility still existed that some magazines could be so badly misaligned with the station on the machine that the hub did not have sufficient width to allow the coil to shift axially to align with the guides on the machine. This was possible because the entire outer surface of a flange for the magazine (which flange also provided one wall for a housing enclosing the hub and the strip material for the magazine) engaged a corresponding sized surface on the machine to align the magazine with the machine. Thus any warpage of that flange in a particular magazine, or differences in thickness anywhere on that flange could affect the alignment.

Also, while the magazine is easily positioned in the station on the machine, the method of positioning it there requires access to the top of the machine. Such access may not be easily obtained where, as is commonly done, the machine is positioned below other pieces of equipment in a rack with only the front face of the rack readily accessible to an operator.

SUMMARY OF THE INVENTION

The present invention provides an improved magazine and machine of the type described above which include locating means for magazines releasably positioned at a magazine receiving station on the machine which locating means have only minimal dependence on the dimentional accuracy of the magazine housing, and which machine provides means for engaging and disengageing a cartridge at the station which accept magazines loaded from a front side surface of the machine to facilitate mounting the machine in stacked relationship in a rack.

The magazine includes a tape support member comprising a generally cylindrical hub portion having a central opening and having a slot extending axially across the full width of the hub portion and communicating with the central opening in the hub portion, and an endless length of strip material having a major portion wound in a coil about the hub portion and a minor portion extending from the innermost wrap of the coil through the slot, partially across said central opening and around the side surface of the coil to the outermost wrap of the coil. A case encloses the support member and the endless length of strip material, which case includes a base wall portion overlaying the side of the tape support member. The base wall portion has three openings in predetermined spaced locations adjacent the tape support member, and the machine comprises three spaced locating pins at its magazine receiving station which locating pins have terminal end portions which are at a precise predetermined location relative to the transducer and guides on the machine, and are adapted to enter the openings in the case of the magazine and to engage and support the tape support member with the hub portion at a precise predetermined location relative to the transducer which allows the coil to move axially in either direction on the hub portion to correct for any remaining misalignment between the magazine and transducer guides. Thus the accuracy with which the hub portion and the coil of strip material around the hub portion are positioned with respect to the magazine receiving station on the machine are dependent only on the location of three small surface areas on the tape support member so that only the location of those surface areas with respect to the hub portion need be carefully dimensionally controlled to insure accurate location of the hub portion and the coil of strip material.

Preferably the machine also includes means for guiding the magazine for movement to and away from the station, which means comprises a moveable frame portion having walls defining a socket opening toward a front wall of the machine which socket is adapted to receive the magazine edgewise of its base wall with a predetermined edge wall of the magazine innermost; and means mounting the moveable frame portion for movement between a disengaged position with the base wall portion of the magazine in the socket spaced from the locating pins, and an engage position with the end portions of the locating pins positioned in the openings in the base wall portion and supporting the tape support member of the magazine in the socket.

Also preferably the walls provide a socket which when viewed through its opening has a shape generally like that of an inverted T so that it can interchangeably receive magazines of varying capacities, including a rectangular magazine filling only in its central section, and a magazine having an end profile the same as that of the socket which can contain a larger coil of tape than the rectangular magazine.

BRIEF DESCRIPTION OF THE DRAWING

The invention will be further described with reference to the accompanying drawing wherein like numbers refer to like parts in the several views, and wherein:

FIGS. 6, 7 and 8 schematically and progressively illustrate the engaged position, an intermediate position, and the disengaged position of the movable frame portion with the magazine positioned therein;

FIG. 9 illustrates an alternate larger capacity embodiment of tape magazine of FIG. 1 which with the magazine shown in FIGS. 1 through 8 is adapted to be interchangeably received by the machine; and FIG. 10 is a fragmentary end view of the movable frame portion of FIG. 1 with the magazine of FIG. 9 positioned therein.

DESCRIPTION OF THE PREFERRED EMBODIMENT

Figure 1:
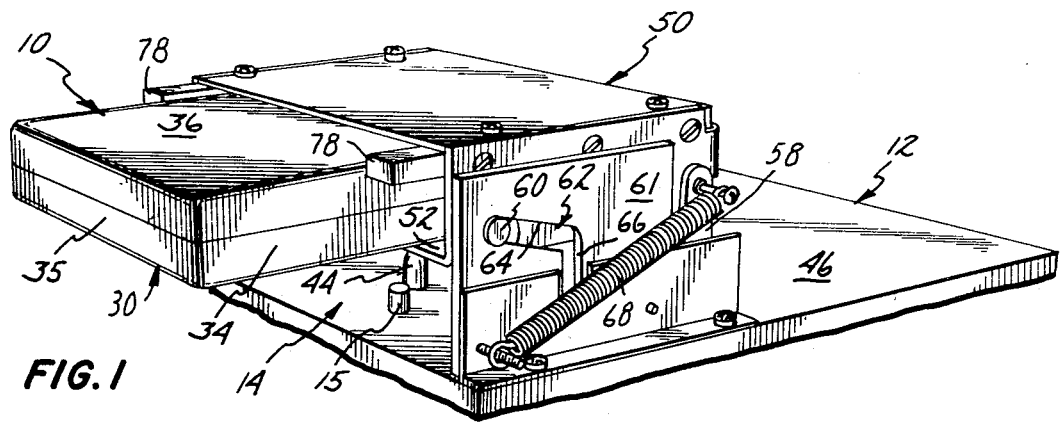
FIG. 1 is a fragmentary perspective view of a tape magazine and recording and/or playback machine according to the present invention shown with the magazine received in a movable frame portion of the machine, which moveable frame portion is shown positioned at a disengaged position with the magazine spaced from a magazine receiving station on the machine.
Figure 2:
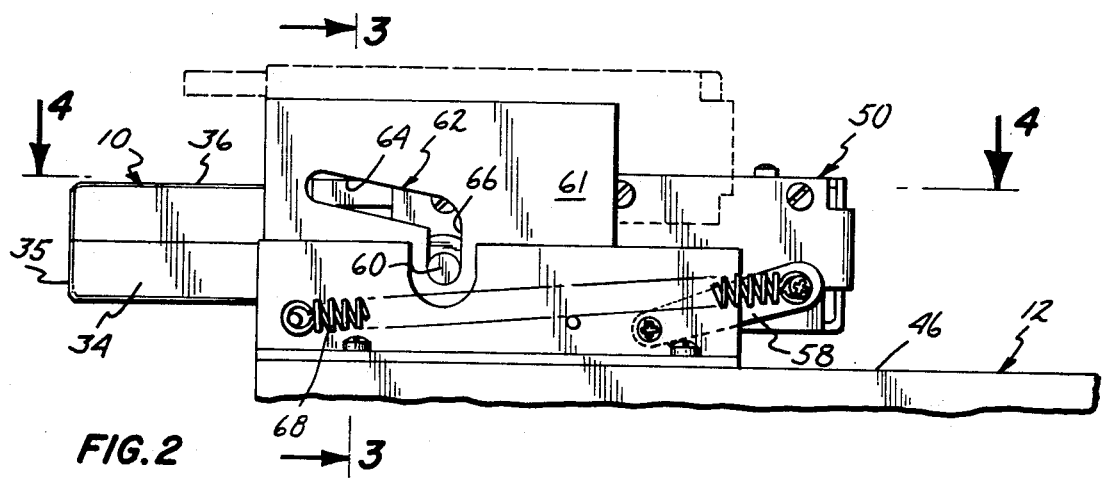
FIG. 2 is a side view of the machine and magazine of FIG. 1 but shown with the movable frame portion and the magazine moved from its disengaged position (shown in dotted outline) to an engage position with the magazine positioned at the station.

Referring now to the drawing, there is shown in the combination according to the present invention comprising a cartridge or magazine (i.e., either the magazine 10 containing an endless length of strip material or magnetic recording tape 11 shown in FIGS. 1 through 8, or, the magazine 70 which also contains an endless length of tape shown in FIGS. 9 and 10), and a machine 12 adapted to releasably and interchangeably receive either the magazine 10 or the magazine 70 at a station 14 to record and/or play signals recorded on the tape 11 via engagement of the distal end portions of three projecting support pins 15 at the station 14 with predetermined surface portions of the magazine 10 or 70 to accurately position the strip material in the magazine 10 or 70 relative to the station 14.

Figure 3:
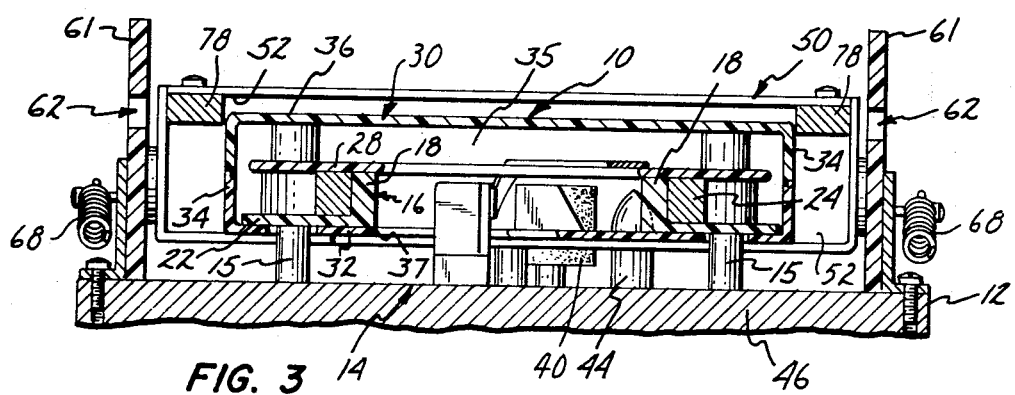
FIG. 3 is an enlarged sectional view taken approximately along lines 3—3 of FIG. 2.
Figure 4:
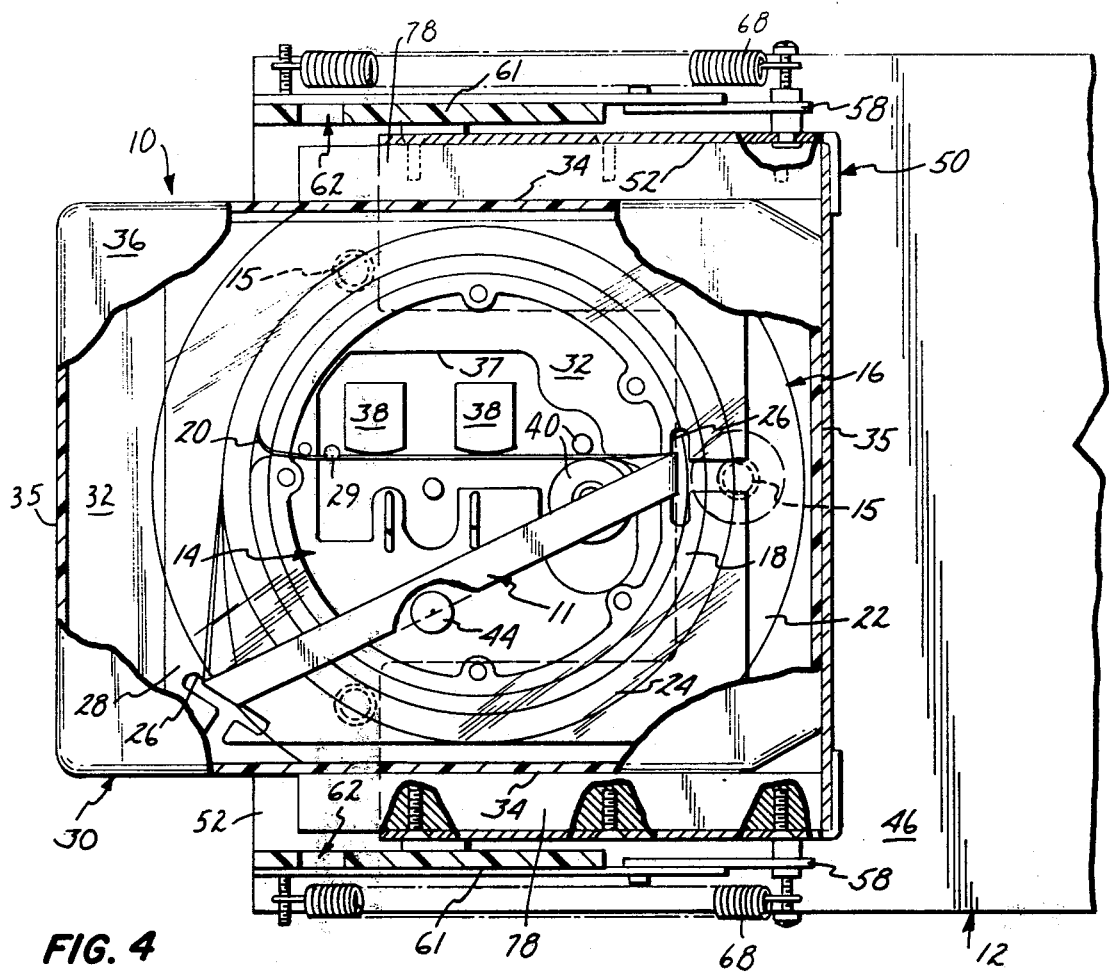
FIG. 4 is an enlarged sectional view taken approximately along lines 4—4 of FIG. 2 and having parts of the magazine broken away to show details.
Figure 5:
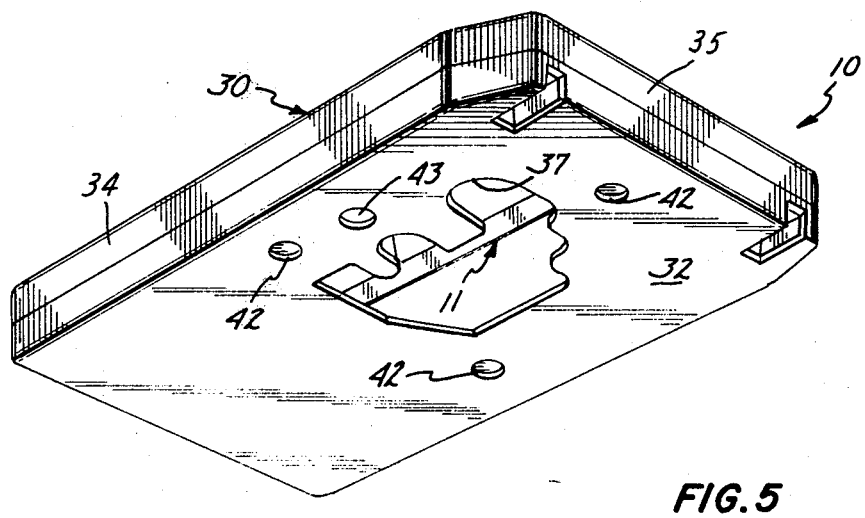
FIG. 5 is a perspective bottom view of the magazine of FIG. 1.

The magazine 10, best seen in FIGS. 3 through 5, includes an integral tape support member 16 of a low friction polymeric material (e.g., "Teflon"), comprising a generally cylindrical hub portion or hub 18 having a central opening and having a slot 20 extending axially across its full width and communicating with the central opening, and a flange portion or flange 22 extending radially outwardly from one edge of the hub portion 18.

The endless length of tape 11 has a major portion wound in a coil 24 about the hub portion 18 adjacent the flange portion 22 and has a minor portion extending from the innermost wrap of the coil 24 through the slot 20, partially across the central opening in the hub portion 18 and around the side surface of the coil 24 to the outermost wrap of the coil 24. From the central opening in the hub portion 18 the tape 11 is guided to the coil 24 via guide slots 26 in a transparent polymeric plate 28 which is fastened to the end of the hub portion 18 opposite the flange portion 22. In addition to the guide slots 26, the plate 28 provides a flange opposing the flange portion 22 to help maintain the coil 24 on the hub portion 18. The hub portion 18 has a width between the plate 28 and flange portion 22 at least 0.025 inch greater than the width of the strip material 11 to allow shifting of the coil 24 axially along the hub portion 18 for alignment of the edges of the coil 24 with a tape edge guide 29 on the machine 12 for guiding the strip material past transducers 38 on the machine 10 in the central opening of the hub portion 18 when the magazine 10 is in the station 14 so that there will be low transverse tension in the strip material 11 being pulled into the central opening in the hub portion 18 through the slot 20; and the hub portion 18 includes a plurality of annular ribs (not shown) spaced axially of the hub portion 18, which ribs extend around the hub portion 18 and define the surface of the hub portion adjacent the innermost wrap of the coil 24 to reduce friction both between the coil 24 and the hub portion and between adjacent wraps of the coil 24 to provide a significant reduction of tension in tape being pulled into the central opening in the hub portion 18, all as is explained in greater detail in U.S. patent application No. 820,250 filed July 29, 1977, the content whereof is incorporated herein by reference.

Also the magazine 10 comprises a two-part case 30 having generally rectangularly disposed wall portions including a base wall portion 32, side wall portions 34 and end wall portions 35 (half of each of which side and end wall portions 34 and 35 is provided by each part of the case 30), and a top wall portion 36. The base wall portion 32 overlays the side of the flange portion 22 opposite the hub portion 18 and has numerous openings including a generally centered opening 37 adapted to receive the transducers 38, the tape edge guides 29 and tape drive rollers 40 at the station; three openings 42 in predetermined equal spaced relationship around the flange portion 22 of the tape support member 16 adapted to receive the end portions of the three support pins 15 at the station 14 to provide a means for precisely locating the hub portion 18 of the magazine 10 with respect to the transducer 38 and guides on the machine 12 (as will later be more thoroughly explained); and an opening 43 communicating with the central opening in the hub portion 18 adapted to receive the tapered end of a locating pin 44 at the station 14 which provides a portion of means for moving the magazine 10 into and out of engagement with the means for locating (which also will later be more thoroughly described).

Except for the portion of the machine 12 that provides the means for locating the magazine 10 or 70 at the magazine receiving station 14 and the means for moving the magazine 10 or 70 into and out of engagement with the means for locating from the front of the machine 12, the machine 12 has generally the same structure as the machine described in U.S. patent application No. 820,250 (incorporated herein by reference). Thus only the portion of the machine 12 that provides these means for locating and means for moving will be described in detail herein.

The means for locating the magazine 10 or 70 at the station includes a top plate 46 of a frame for the machine from which the three support pins 15 project upwardly. The distal surfaces of the support pins 15 are aligned in one plane, which plane has a precise location relative to the transducers 38 and the tape edge guides 29 at the station 14 such that with the surface opposite the hub portion 18 of the flange portion 22 in the magazine 10 or 70 resting on the ends of the support pins 15, the hub portion 18 around which the coil 24 of tape is wound will be properly centered around the tape edge guides 29 and the transducers 38. Maintenance of the same alignment between different magazines 10 or 70 will be dependent only on providing flange portions 22 with the same thickness dimension at the openings 42, which dimensions can easily be checked and adjusted during production, if necessary, and will not be affected by irregularities in the case 30 caused during or after production.

Alternatively, openings might be found in the flange portion 22 (e.g. during molding of the tape support member 16) so that the ends of the support pins 15 could bear directly against an edge surface of the hub portion 18 to provide accurate positioning of the hub portion 18.

The means for moving the magazine 10 or 70 into and out of engagement with the support pins 15 included in the means for locating the magazine 10 or 70 at the station 14 comprises a movable frame portion 50 having walls defining a socket 52 adapted to receive either the magazine 10 or the magazine 70 edgewise of its base wall portion 32 in a predetermined orientation; means mounting the movable frame portion 50 on the top plate 46 of the machine frame for relative movement between a disengaged position with the base wall portion 32 of the magazine 10 or 70 spaced from the support pins 15, the transducers 38, the tape edge guide 29 and the drive rollers 40 when the magazine 10 or 70 is positioned in the socket 52 (FIG. 1), and an engage position (FIGS. 2 and 3) with the end portions of the support pins 15 positioned within the openings 42 in the base wall portion 32 of the magazine 10 or 70 to support the tape support member in the magazine 10 or 70, and with the transducers 38, the tape edge guide 29 and the drive rollers 40 projecting through the opening 37 into the central opening in the hub portion 18; and means for aligning the magazine 10 to afford engagement of the support pins 15 in the openings 42 as the frame portion 50 moves from its disengaged toward its engage position, which means for aligning is provided both by the walls defining the socket 52 and the locating pin 44 which has a tapered end portion projecting above the support pins 15 to engage the opening 43 in the base wall portion 32 and properly position the magazine 10 or 70 in the socket 52 for engagement by the support pins 15 just before the movable frame portion 50 reaches its engage position. After the tapered pin 44 engages with the opening 43 it will also provide means for locking the magazine 10 or 70 in the frame portion 50 while the magazine 10 or 70 is at the station 14.

The means mounting the movable frame portion 50 for movement between its disengaged and engaged position comprises parallel arms 58 each having one end pivotably mounted on the top plate 46 of the frame and another end pivotably mounted on a different one of the side walls of the movable frame portion 50 at the end of the side wall opposite the opening to the socket 52 to afford movement of a rear part of the movable frame portion 50 from a first position spaced a first distance from the top plate 46 to a second position more closely adjacent the top plate 46; opposite trunnions 60 projecting outwardly from the side walls of the movable frame portion adjacent the opening; and cam plates 61 fixed to the top plate on opposite sides of the movable frame portion 50 and each having edge surfaces defining a slot 62 receiving a different one of the trunnions 60 and guiding that trunnion 60. Each slot 62 has a generally horizontal portion 64 guiding the trunnion 60 therein to afford movement of a front part of the moveable frame portion 50 first along a generally horizontal path toward the rear of the machine 12 upon movement of the rear part of the movable frame portion 50 from its first to its second position, and a generally vertical slot portion 66 extending from the generally horizontal portion 64 of the slot toward the top plate 28 to afford movement of the front part of the moveable frame portion 50 as toward the top plate 46 by pivoting the movable frame portion 50 about its juncture with the arms 58 to position the magazine 10 or 70 on the support pins 15 at the station 14 after the rear part of the moveable frame 50 is in its second position.

Also the means for mounting the movable frame portion 50 includes parallel springs 68 tensioned between the cam plates 61 and the movable frame portion 50 which are oriented to provide means for biasing the rear part of the movable frame portion 50 to its first position when the trunnion 60 are along the generally horizontal portions 64 of the slots 62 to help return the movable frame portion 50 to its disengaged position when a magazine 10 or 70 is being removed, but which will not apply a force component that will move the trunnion 60 out of the generally vertical portions 66 of the slots 62 when the frame position 50 is in its engaged position.

The magazine 70 illustrated in FIG. 9 has the same structure as the cassette 10 except that a second lower portion 71 of a case 72 for the cassette which encloses the coil of strip material around the hub portion for the cassette 70 comprises second side wall portions 73 that are spaced further apart than parallel first side wall portions 74 of a first portion 75 of the case 72 enclosing means defining the path for the strip material around the side surface of the coil (which is provided by a slotted plate like the slotted plate 28 in the magazine 10) to provide clearance so that a larger coil of strip material may be wound on the hub portion in the cassette 70 than on the hub portion 18 in the cassette 10.

Transverse guiding for the cassette 70 in the movable frame portion, like that for the cassette 10, is provided by elongate side guide members 78 defining the socket in the moveable frame portion 50, which side guide members 78 only bear against the first side wall portions 74 on the first portion 75 of the case 72. The openings in the base wall of the magazine 70 and its hub portion are transversely related to the first side wall portion 74 so that cases having various spaces between the second side wall portion 73 may be interchangeably received in the socket in the moveable frame member 50 without adjustment of the machine 12.

We claim:
1. In combination
   a magazine comprising:
      a support member comprising a generally cylindrical hub portion having a central opening and having a slot extending axially across its full width and communicating with said central opening;
      an endless length of strip material having a major portion wound in a coil about said hub portion and a minor portion extending from the inner- most wrap of the coil through said slot, partially across said central opening and around the side surface of the coil to the outermost wrap of the coil; and a case enclosing said support member and endless length of strip material, said case including a base wall portion overlaying the side of said support member, said base wall portion having three openings in predetermined spaced locations adjacent said support member; and a recording and/or playback machine comprising:

means defining a station for releasably receiving said magazine in a predetermined position on said machine, said means for releasably receiving comprising three spaced support pins having terminal end portions adapted for entering the openings in said case to engage and support a surface of said support member; drive means having members adapted to be positioned within the central opening of said magazine when said magazine is positioned in said station for making driving engagement with said strip material to pull said strip material through said slot from said coil with the edges of said strip material between said drive means and said slot generally coplanar with the edges of said coil;

a transducer adapted to be positioned within said central opening along said strip material between said drive mechanism and the slot in said hub portion when said magazine is positioned at said station; and an edge guide for said strip material adapted to be positioned within said central opening adjacent said transducer to guide said strip material past said transducer along a predetermined path;

the terminal end portion of said support pins being positioned at a precise location with respect to said edge guide to precisely position said support member so that said coil can shift axially on said hub to align the edges of said coil with the edges of said strip material at said edge guide.

2. A combination according to claim 1 wherein said machine further includes means guiding said magazine for movement to and away from the station comprising:

a movable frame portion having walls defining a socket having an opening adapted to receive said magazine edgewise of said base wall portion in a predetermined orientation; and means mounting said movable frame portion on said means for defining a station for movement between a disengaged position with the base wall portion of the magazine spaced from said support pins when the magazine is in the socket, and an engage position with the end portions of said support pins positioned in the openings in said base wall portion of the magazine and supporting the magazine when the magazine is in the socket.

3. A combination according to claim 2 wherein said means for defining a station comprises a top plate, said support pins project upwardly from said top plate, said movable frame portion includes side walls flanking said opening and an end wall between said side walls opposite said opening, and said means mounting said movable frame portion for movement comprises parallel arms each having one end pivotally mounted on said top plate and another end pivotably mounted on a different one of said side walls at its end opposite said opening to afford movement of a rear part of said movable frame portion adjacent said end wall from a first position spaced from said station to a second position more closely adjacent said station, opposite trunnions projecting outwardly from opposite sides of said movable frame portion and cam plates fixed to said top plate on opposite sides of said movable frame portion and each having edge surfaces defining a slot receiving and guiding a different one of said trunnions, said slots each having a generally horizontal portion guiding said trunnions upon movement of said rear part of the frame from its first to its second position, and a portion extending from said generally horizontal portion toward said top plate to afford movement of a front part of said frame adjacent said opening toward said top plate by pivoting said movable frame portion about said arms to position the magazine on the support pins at said station when the magazine is in said socket.

4. A combination according to claim 3 wherein said means mounting said frame for movement comprises means for biasing the rear portion of said frame toward said first position when said trunnions are along the generally horizontal portions of said slots.

5. A combination according to claim 1 wherein said tape support member comprises a flange portion extending radially outwardly from one edge of said hub portion, said three openings in said base wall are located adjacent said flange portion, and said support pins are adopted to engage the surface of said flange portion opposite said hub portion.

6. A magazine comprising:

an integral support member comprising a generally cylindrical hub portion having a central opening and having a slot extending axially across its full width and communicating with said central opening, and a flange portion extending radially outwardly from one edge of said hub;

an endless length of strip material wound in a coil about said hub adjacent said flange and extending from the innermost wrap of the coil through said slot, partially across said central opening and around the side surface of the coil to the outermost wrap of the coil; and a case enclosing said support member and endless length of strip material, said case including a portion overlaying the side of said flange portion opposite said hub portion and having three through openings in predetermined spaced locations around said flange portion adapted to receive locating pins on a recording and/or playback machine with which said magazine is engaged.

* * * * *